UNITED STATES PATENT OFFICE.

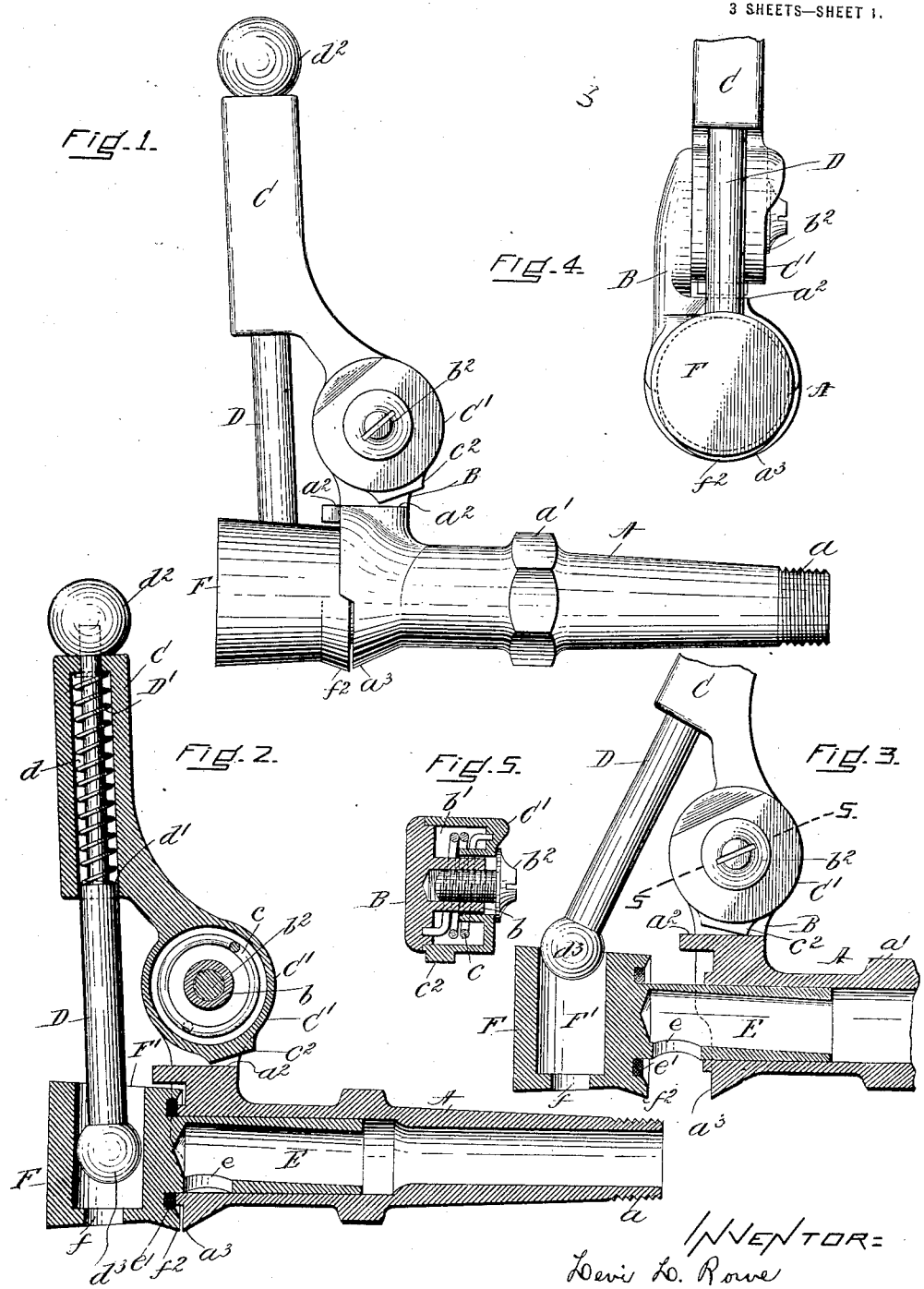

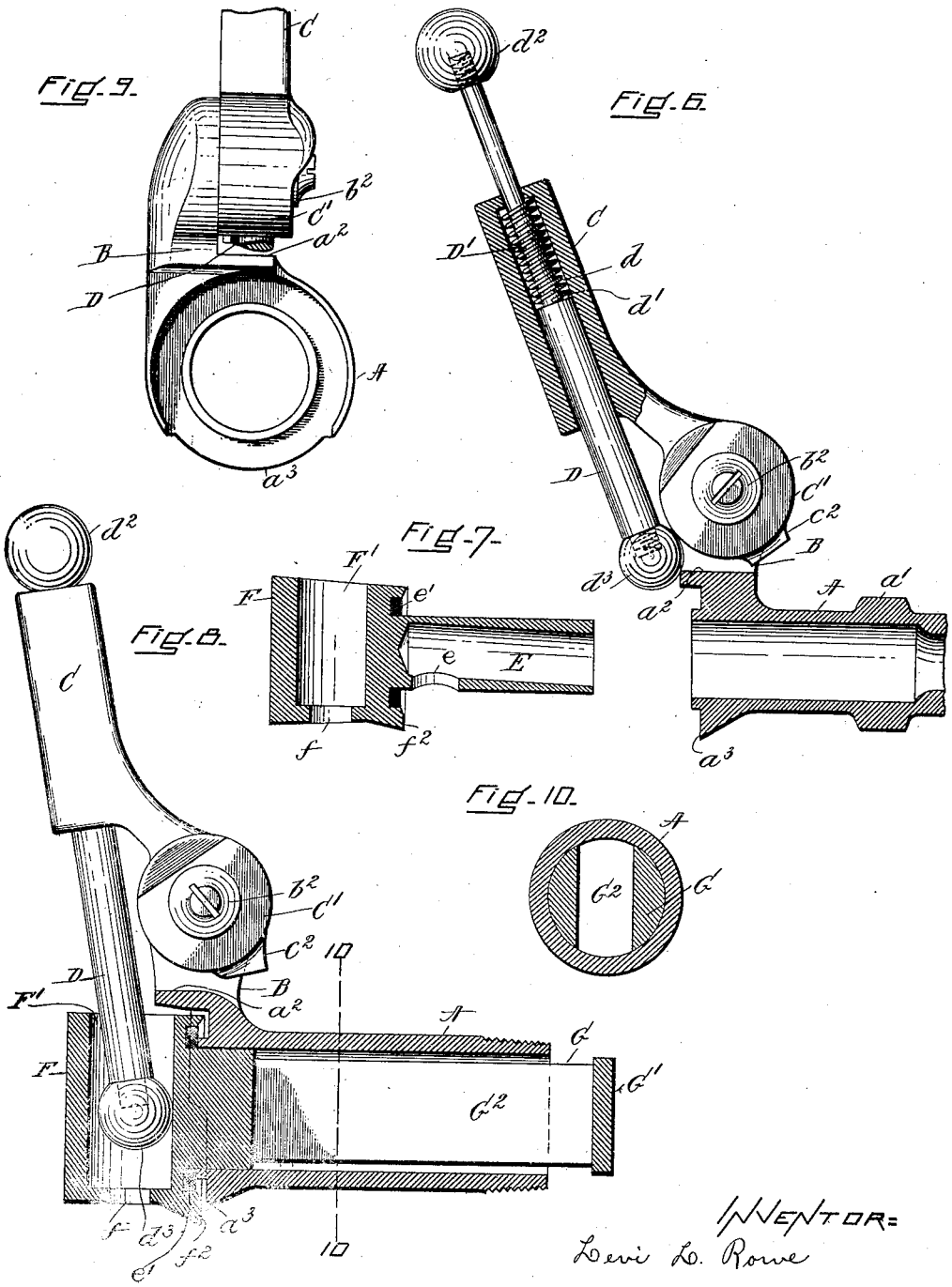

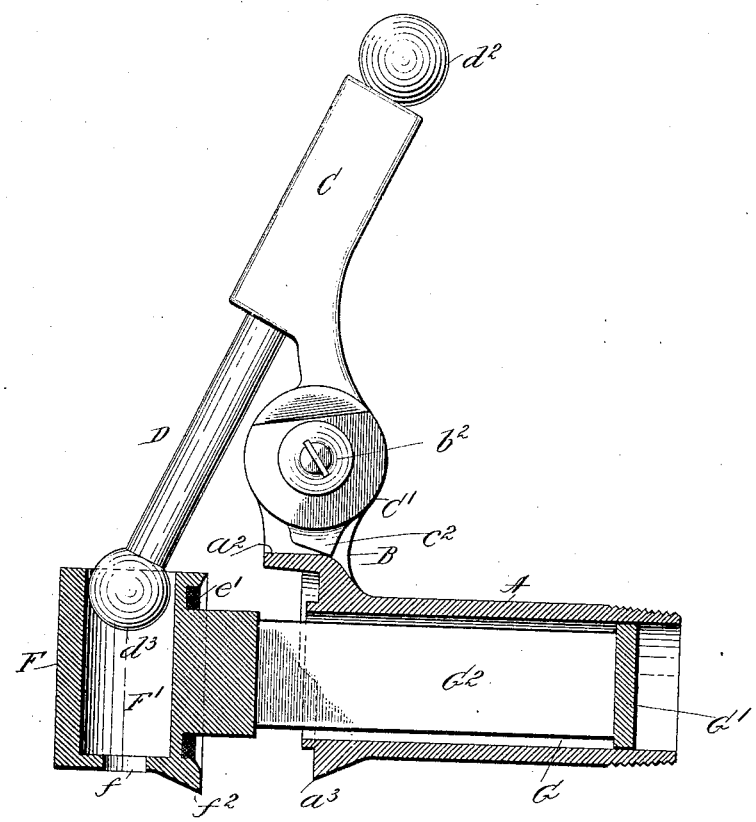
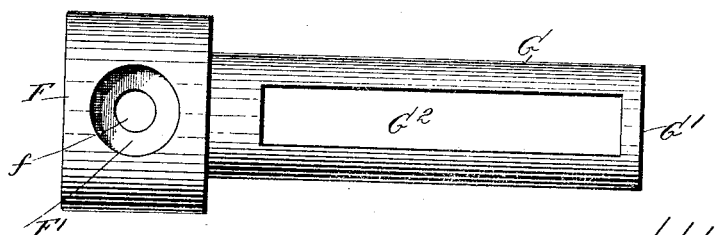

LEVI L. ROWE, OF BOSTON, MASSACHUSETTS.

FAUCET.

1,350,885.   Specification of Letters Patent.   Patented Aug. 24, 1920.

Application filed September 21, 1918. Serial No. 255,153.

*To all whom it may concern:*

Be it known that I, LEVI L. ROWE, of Boston, in the county of Suffolk and State of Massachusetts, a citizen of the United States, have invented a new and useful Improvement in Faucets, of which the following is a specification.

My improvement relates to a faucet of a kind adapted especially for use in connection with milk and chocolate tanks or tanks of a similar kind where it is necessary that the faucet shall be kept absolutely clean. Heretofore such faucets have been either very difficult to clean or else could be cleaned only with a great deal of difficulty, requiring to be taken apart and thoroughly scalded and scoured.

My invention consists in a faucet which can be taken apart very easily without the use of any tool and every part which comes in contact with the liquid may easily be cleaned.

My invention will be understood by reference to the drawings in which it is shown in its preferred form.

Figure 1 is a side elevation of a faucet embodying my invention.

Fig. 2 being a vertical, longitudinal section thereof, both views showing the faucet in closed position.

Fig. 3 is a section showing the valve in open position.

Fig. 4 is a front elevation.

Fig. 5 is a section on line 5—5 of Fig. 3.

Fig. 6 is a section showing the stationary member and the operating handle when in position to remove the valve, and Fig. 7 is a section of the valve.

Fig. 8 is a section showing another form of my invention;

Fig. 9 being a front view of the stationary member, and

Fig. 10 a section on line 10—10 of Fig. 8.

Fig. 11 is a section of the form of my invention shown in Fig. 8, the valve being open, and Fig. 12 is a plan view of this form of valve.

In all of the views A is the stationary tubular member which is threaded at its inner end as at $a$ and preferably has a hexagonal or other shaped portion $a^1$ which is adapted to be engaged by a wrench for screwing the stationary member into the tank (not shown). This stationary member has a lug B having a tubular projection $b$ therefrom, which has an interior thread and serves as a bearing or fixture for the hub $C^1$ forming part of the handle C, this hub being hollow and having a tubular projection fitting onto the part $b$. Within this hub is a chamber $b^1$. Within this chamber $b^1$ is a spiral spring $c$ one end of which sets into a recess in the part B and the other into a recess in the hub $C^1$ so as to be under tension and keep the handle C normally in a vertical position. A screw $b^2$ screwing into the projection $b$ holds these parts together, but allows the handle member C to swing on the part $b$ as an axis.

The stationary member A also has a shoulder $a^2$ and the lug B a stop member $c^2$, the two serving to limit the hinge movement of the handle C in opening the valve, the shoulder $a^2$ also serving as a rest to support the rod D when the valve is removed (see Fig. 6).

The handle C is hollow to form a chamber $d$ which is open at the bottom and has an opening in the top. In this chamber is the locking rod D the upper part of which is reduced in diameter to form a shoulder $d^1$ between which and the top wall of the chamber is a spiral spring $d^i$ which holds the rod D in extended position. The rod D is enlarged at each end preferably by balls $d^2$, $d^3$.

The valve comprises a tubular barrel E closed at one end the interior of which connects with the passage through the stationary member A in which it slides and it has an opening $e$ through which the liquid may be drawn. The outer end of the valve comprises a head F having a vertical socket $F^1$ in which the lower end of the rod D normally lies. An opening $f$ at the bottom of this passage allows the socket $F^1$ to drain when being cleaned. The valve is also provided with a suitable groove in which is placed a ring packing $e^1$ to engage an annular projection on the end of the member A to prevent leakage when the valve is closed.

To open the valve it is only necessary to push the handle C toward the tank when the parts assume the position shown in Fig. 3, and the liquid flows from the passage in the member A and barrel E and opening $e$ into the glass or receptacle below.

I prefer to make the interior passage of the barrel E as shown in Fig. 3, that is, its wall is not parallel with its axis, but the passage is inclined upwardly so that the liquid will have to change its direction something more than a right angle before falling into the glass, thus reducing or preventing the tendency of the liquid to spread outside the glass when it falls. I also prefer to provide projecting lips as at $a^3$ and $f^2$ so that any drop of liquid which may be left at the mouth of the stationary member after the valve is closed cannot flow back along the outside of the stationary member.

In Figs. 6 and 7 I have shown the manner in which the faucet is taken apart. By lifting the rod D so that it is pulled out of the socket $F^1$ its lower end $d^2$ may be rested upon the forward edge of the shoulder $a^2$. The valve is thus free to be pulled out from the passage in the stationary member A and may be easily cleaned and then put back in place. The rod being released from the shoulder $a^2$ will drop into the socket $F^1$, the faucet as a whole being then ready for use. The spring $c$ keeps the valve normally closed.

It is sometimes desirable that in the service of the liquid it be measured, and in Figs. 8 to 12 I have shown means for this purpose. In this case the handle and the general construction of the valve are the same as above described so far as the opening and closing of the faucet is concerned, but instead of being open at its end as is the passage E shown in Figs. 2 and 3, the barrel G of the valve is closed at its inner end as at $G^1$ and it has a chamber $G^2$ in it, which chamber corresponds in capacity to the amount of liquid which is to be served at any one time. The barrel G of the valve fits the passage in the stationary member A, but is longer than the stationary member so that it will project some little distance beyond it as shown in Fig. 8 and connect the inner end of the chamber $G^2$ with the interior of the tank. As a result the liquid in the tank fills the chamber and when it is desired to serve the liquid, the valve being opened as shown in Fig. 11, the end $G^1$ of the barrel closes the passage in the stationary member so that it will allow no more liquid to flow into it. The chamber $G^2$ empties itself into the glass through the opening $e$ in the manner before described in connection with the other form of my invention. Except in this respect the two valves shown are identical.

Other forms of this invention will occur to those skilled in the art, but the above are the simplest forms now known to me, and they possess all the advantages above referred to.

What I claim as my invention is:—

1. The faucet above described comprising a tubular stationary member one end of which is adapted to be permanently connected with a source of supply, a hollow valve member one end of which is open to the source of supply when said valve member is in closed position, said valve member being adapted to slide longitudinally in said stationary member, a handle fulcrumed on said stationary member and disconnected to but adapted to engage and operate said valve member and when out of engagement therewith to allow said valve member to be withdrawn from said stationary member.

2. The faucet described comprising a tubular stationary valve seat carrying portion, a hollow valve member adapted to slide longitudinally in the seat carrying portion, the chamber of said valve member being adapted to be connected to a source of supply when the valve is closed, and a handle fulcrumed on said stationary member and connected to said valve member whereby the movement of said handle will open or close the valve, and means for normally keeping said handle in position to hold said valve closed.

3. The faucet above described comprising a tubular stationary member, a valve located therein, and a handle engaging said valve and adapted to operate it, said handle comprising a member pivotally connected to said stationary member to swing thereon and a spring-controlled rod, said valve having a socket to receive one end of said spring-controlled rod.

4. In a faucet, a stationary tubular member, a tubular valve adapted to slide longitudinally in said member, said valve having a socket in the outer end thereof, and a handle pivotally mounted on said stationary member and comprising a rod one end of which is located in said socket, said rod being capable of a movement out of said socket without disassembling whereby it may release said valve.

5. In a faucet, a stationary tubular member, a tubular valve adapted to slide longitudinally in said member, said valve having a socket in the outer end thereof, and a handle pivotally mounted on said stationary member and comprising a rod one end of which is located in said socket, and means for controlling said rod to keep said valve in closed position, said rod being capable of a movement out of said socket without disassembling whereby it may release said valve.

6. In a faucet, a stationary tubular member, a tubular valve adapted to slide longitudinally in said member, said valve having a socket in the outer end thereof, and a handle pivotally mounted on said stationary member and comprising a rod one end of which is located in said socket, said rod being adapted to be withdrawn from said socket without disassembling to allow said valve to be removed from said stationary member.

7. In a faucet, a stationary tubular member, a tubular valve adapted to slide longitudinally in said member, said valve having a socket in the outer end thereof, a handle pivotally mounted on said stationary member and comprising a rod one end of which is located in said socket, said rod being adapted to be withdrawn from said socket to allow said valve to be removed from said stationary member, and means to support said rod when withdrawn from said socket.

8. In a faucet, a stationary tubular member, a tubular valve adapted to slide longitudinally in said member, said valve having a socket in the outer end thereof, a handle pivotally mounted on said stationary member and comprising a rod one end of which is located in said socket, said rod being adapted to be withdrawn from said socket without disassembling to allow said valve to be removed from said stationary member, and means normally to hold said rod in said socket.

9. The faucet above described comprising a tubular stationary member, a valve located therein and having a head, and a handle engaging said valve and adapted to operate it, the engaging ends of said stationary member and the head of said valve being provided with projecting lips whereby drops of liquid will be prevented from flowing along the outside of said stationary member or said valve head after said valve has been closed.

10. The faucet above described comprising a tubular stationary member, a valve located therein, and a handle engaging said valve and adapted to operate it, said valve having a chamber therein closed at both ends and open at its sides, being longer than said stationary member whereby it may be used to measure a predetermined amount of liquid.

11. The faucet above described comprising a stationary member having a passage therethrough, a valve having a passage therein, the longitudinal axis of said valve and of said stationary member being coincident, means for keeping said valve normally in closed position, said valve having a head containing a socket at its outer end, said means comprising a handle pivotally mounted on said stationary member and adapted to engage said valve to open it and to be moved from engagement therewith without disassembling to allow said valve to be removed from said stationary member.

12. The faucet above described comprising a tubular stationary member, a valve located therein, and a handle engaging said valve and adapted to operate it, said valve having a chamber therein closed at both ends and open on one side thereof, said chamber being adapted to receive fluid from a tank when the valve is in closed position and to discharge fluid from said chamber when in open position.

13. The faucet above described comprising a stationary tubular member connectible to a tank and a slidable tubular valve located therein, the said valve being closed at both ends and open along its sides and extending when in closed position into such tank whereby the chamber within it may be filled when said valve is closed and when said valve is open the connection between its chamber and such tank may be closed whereby said valve at each sliding opening motion will deliver only a predetermined quantity of liquid, and means for operating said valve.

LEVI L. ROWE.